United States Patent Office 3,645,917
Patented Feb. 29, 1972

3,645,917
POLYETHERS CONTAINING AZIDOMETHYL SIDE CHAINS
Edwin J. Vandenberg, Foulk Woods, Del., assignor to Hercules Incorporated, Wilmington, Del.
No Drawing. Filed Feb. 25, 1970, Ser. No. 14,186
Int. Cl. C08g 23/06
U.S. Cl. 260—2 A                    8 Claims

ABSTRACT OF THE DISCLOSURE

High molecular weight polyethers are provided that contain azidomethyl groups pendant from the main polymer backbone. These polymers are characterized by containing from 0.2 to 100% of azidomethyl ethylene oxide repeating units. They are prepared by reacting a polymer of an epihalohydrin with a metal azide. The azidomethyl polyethers can be cross-linked by heating at low temperature (under 100° C.).

---

This invention relates to polyethers containing pendant azidomethyl groups.

It is well known that polyethers can be prepared by the homo- and copolymerization of epoxides (oxiranes) and oxetanes. Many of these have side chains pendant from the main polymer backbone, which side chains may contain halogen as, for example, chloromethyl pendant groups, ether groups such as alkyloxyalkyl groups, or ethylenically unsaturated groups such as alkenyl or alkenyloxyalkyl groups.

Now in accordance with this invention, an entirely new class of polyethers has been discovered, namely polyethers containing pendant azidomethyl groups. These new azidomethyl polyethers are prepared by reacting epihalohydrin polymers with a metal azide whereby part or all of the halogen of the halomethyl group is replaced by an azido group.

The polyethers of this invention are high molecular weight, essentially linear polyethers wherein from 0 to 99.8% of the repeating units are epihalohydrin units, from 0 to 99.5% of the repeating units are monomer units of at least one other cyclic oxide, and from 0.2 to 100% of the repeating units having the formula

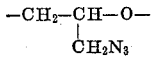

As stated above, these polyethers containing azide groups are prepared by reacting the halogen of an epihalohydrin polymer with a metal azide. It was most surprising to discover that this reaction took place so readily and even more surprising that it does so without any appreciable chain cleavage. Any stable metal azide can be used for the reaction but preferably will be an alkali metal or alkaline earth metal azide such as the azides of cesium, magnesium, calcium, strontium, or barium, and most preferably will be sodium, potassium or lithium azide.

By the term "polymer of epihalohydrin" as used throughout this application is meant the homopolymers of epihalohydrins as well as the copolymers with one another and copolymers of epihalohydrins with up to 99.5% by weight of total monomer of at least one other cyclic oxide.

The polymers of epihalohydrins which are reacted with the metal azides in accordance with this invention preferably have weight average molecular weights of at least 25,000 and more preferably of at least 50,000 (RSV of at least 0.1 and preferably at least 0.2, as determined on a 0.1% solution in α-chloronaphthalene at 100° C.). The polymers are the known crystalline and amorphous homopolymers produced from any epihalohydrin, e.g., epichlorohydrin, epibromohydrin, epiiodohydrin or epifluorohydrin or any mixture of these epihalohydrins, and the known crystalline and amorphous copolymers of epihalohydrins such as epifluorohydrin, epibromohydrin, epiiodohydrin, and preferably epichlorohydrin. with up to 99.5%, preferably with up to 98% and most preferably with up to 95% by weight of the total monomers of at least one other cyclic oxide which can be an oxirane, oxetane, or tetrahydrofuran. Specific oxiranes and oxetanes which can be copolymerized with epihalohydrin include the alkylene oxides having 1 to 20 carbon atoms, such as, for example, ethylene oxide, propylene oxide, butene-1 oxide, cis- and trans-butene-2 oxide; the cycloaliphatic epoxides containing 6 to 12 carbons such as cyclohexene oxide and the like; the aryl alkylene oxides such as styrene oxide, etc.; the saturated glycidyl ethers such as methyl glycidyl ether, ethyl glycidyl ether, phenyl glycidyl ether, etc.; the ethylenically unsaturated epoxides such as allyl glycidyl ether, the mono-epoxides of dienes or polyenes or the glycidyl esters of ethylenically unsaturated acids, etc.; and the oxetanes such as oxetane, also designated as trimethylene oxide, the 2- or 3-mono-substituted oxetanes such as 2-chlorooxetane, 3-bromooxetane or the 2,2- or 3,3-disubstituted oxetanes. Other cyclic oxides suitable for copolymerization with the epihalohydrin include the tetrahydrofurans such as tetrahydrofuran, 2-, and 3-methyltetrahydrofuran, 2,3-dimethyltetrahydrofuran, 2,3,4-trimethyltetrahydrofuran, 2,3-diethyltetrahydrofuran, 2,3-diphenyltetrahydrofuran, and the like. Similarly, copolymers derived from epihalohydrin and the haloalkyl glycidyl ethers such as β-chloroethyl glycidyl ether, the cis- and trans-halosubstituted alkylene oxides such as the 2-chloro-3,4-epoxybutane, 2-bromo-3,4-epoxybutane, 1,4-dichlorobutene-2-oxides, 4-chloro-butene-1-oxide, 3,4-dichlorobutene-1-oxide, 2-chloro-4,5-epoxypentane, 5-chloropentene-1-oxide, 6-bromo-pentene-1-oxide, 6 - bromopentene-2-oxide and 1,6-dichlorohexene-3-oxide, the halosubstituted cycloalkylene oxides such as 1-chloromethyl-2,3 - epoxycyclohexane, 1,2-bis-chloromethyl-3,4-epoxycyclohexane, 1 - chloro-4-phenoxy-cis-2,3-epoxycyclobutane, amino epoxide monomers (or the quaternized form) such as 1-dialkylamino-2,3-epoxypropane, o-, m- or p-dialkylaminophenyl glycidyl ether, cis- or trans-1,4-bis(dialkylamino)-2,3-epoxybutane, 3- or 4-dialkylamino-1,2-epoxycyclohexane and the like can be modified in accordance with this invention. Exemplary polymers are also described in U.S. Pats. 3,158,581; 3,158,591; 3,205,183; and 3,341,- 475.

The particular conditions for preparing the polyethers of the invention will vary, depending on the starting polyether, the reactants, diluent (if used), the amount of modification desired, the ultimate end use, etc. In general, the reaction can be carried out in bulk, in a diluent in which the polyether is dispersed, or in a solvent for the polyether. The temperature at which the reaction is carried out should be selected so as to avoid cross-linking reactions due to decomposition of the azidomethyl group being formed. Generally the reaction will be carried out at temperatures varying from about 30° C. to about 150° C., and preferably at 30° C. to 100° C., for times varying from minutes to many hours (depending upon the temperature, degree of substitution desired, etc.) using from a stoichiometric amount up to a large excess of the amount of the metal azide necessary for the desired degree of substitution, as for example, using an amount equal to 1 to 500% of the reactive halogens present in the polymer. Preferably the substitution reaction is carried out in a solvent for the polyether and/or the metal azide. Preferred solvents include dimethylsulfoxide, dimethylformamide, dimethylacetamide, hexamethylphosphoroamide, N-methylpyrrolidone, dioxane, tetrahydrofuran, dimethylether of diethylene glycol, acetone, water, or mixtures thereof, etc. Liquids which are not solvents for the polyether, such as the aliphatic or aromatic hydrocarbons, the halogenated aromatic hydrocarbons and the like, can also be used if it is desired to carry out the reaction in liquid dispersion. Most preferably, the reaction is carried out in dimethylsulfoxide as solvent or in bulk or in dispersion using a small amount of dimethylsulfoxide.

The product can be recovered in conventional manner. When the reaction is carried out in a solvent, the product can be isolated by evaporation of the solvent or by precipitation under mild conditions (at temperatures below 50° C.) to avoid crosslinking, although more drastic conditions can be used if a partially or highly cross-linked product is desired.

The initial reaction products of this invention contain at least 0.2, and preferably at least 0.5% of the azidomethyl containing repeating units. The polymers of this invention will vary widely, depending upon the composition and nature of the starting polymer, that is, whether crystalline, amorphous, rubbery, water-soluble or insoluble, etc., and upon the amount of azidomethyl groups present in the product. They are high molecular weight polymers having a molecular weight of at least 25,000, and preferably at least 50,000, corresponding to an RSV (reduced specific viscosity) of at least 0.1 and preferably at least 0.2 as determined on a 0.1% solution in a suitable solvent, generally tetrachloroethane at 25° C. In some cases, as for example the azidomethyl polyether produced from crystalline poly(epichlorohydrin), it may be necessary to carry out the RSV at a higher temperature such as 80° to 100° C. using conditions where crosslinking side reactions will not be appreciable which would of course increase the molecular weight.

One of the unique properties of these polyether azides is their ability to be cross-linked by heating at relatively low temperatures, e.g., at temperatures below 100° C., in contrast to aliphatic azides which normally require temperatures of 150°–200° C. The ability of these polymers to be cross-linked by heat, by photolysis and by the addition of polyfunctional dipolarophiles as for example diacetylenes, diolefins such as norbornadiene, and dicyclopentadiene, bismaleimides such as hexamethylene bis(maleimide) and phenylene bis(maleimide), divinyl ethers, etc. makes it possible to enhance the stability, adhesion, solvent resistance and physical properties of the polymer. Hence the polymers of this invention have utility in diverse areas, as for example, as coatings of improved adhesion for substrates such as metal, glass, textiles, paper, wood, etc., as binders or adhesives for nonwoven textiles, paper, plastics, films, etc., as sizing agents and treating agents, e.g., antistats, for textiles, as semipermeable membranes, and as plastics, fibers, films and elastomers.

The azide group in these polymers can also be utilized to make other useful derivatives by taking advantage of their ability to undergo reactions typical of aliphatic azides, as for example, the 1,3-addition reactions due to the 1,3-dipolar nature of the azide group. Thus, with olefins, 5-membered ring groups (triazolines) are formed without loss of nitrogen. Depending on the additive and conditions, the 5-membered ring product can decompose to useful aziridines or ketimines. Hence these reactions can be utilized for the preparation of polyethers containing other useful functional groups.

The following examples illustrate the preparation of the azido polyethers of this invention. All parts and percentages are by weight unless otherwise indicated. The dimethylsulfoxide used as solvent was dried prior to use by passage through a molecular sieve column. Unless otherwise indicated, the stabilizer used in the examples was the reaction product of 1 mole of crotonaldehyde and 3 moles of 3-methyl-6-tert-butylphenol, the product being essentially 1,1,3-tris(2-methyl-4-hydroxy-5-tert-butylphenyl) butane. The molecular weights given in the examples are weight average molecular weights of the polymer. When molecular weight is indicated by reduced specific viscosity (RSV), the term denotes the specific viscosity divided by concentration as determined on a solution of the polymer in a suitable solvent. The reduced specific viscosities of the azidomethyl substituted polyethers were run on a 0.1% solution in tetrachloroethane at 25° C. unless otherwise indicated.

EXAMPLE 1

Two (2) parts of an epichlorohydrin-ethylene oxide copolymer (70% by weight epichlorohydrin; molecular weight of $2.7 \times 10^6$; RSV of 5 as determined on a 0.1% solution in α-chloronaphthalene at 100° C.) containing 0.5% of stabilizer was dissolved in 55 parts of dry dimethylsulfoxide at 65° C. under a nitrogen atmosphere, and 0.952 part of sodium azide (100% of the stoichiometric amount) was added to the solution. The reaction mixture was then tumbled at 65° C. for 5½ hours under a nitrogen atmosphere. The product was recovered from the reaction mixture solution by precipitation with 5–10 volumes of methanol. The fluffy, white precipitate was collected by filtration, washed with methanol and dried at room temperature for 16 hours under vacuum. The light tan polymer so recovered amounted to a conversion of 49% and had an RSV of 1.9. Analysis showed it to contain 24.2% chlorine and 6.6% nitrogen, showing that 21.7% of the chloro groups had been replaced by azido groups. The nitrogen analysis showed the polymer to contain 15.5% of

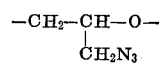

units.

The methanol-soluble portion of the product was concentrated and then was dialyzed against distilled water for two weeks with twice daily changing of the dialyzate. The water-insoluble polymer was recovered, washed and dried. It was a light tan rubber, amounted to a conversion of 34% and on analysis was found to contain 20.75% chlorine and 4.70% nitrogen, showing that the polymer contained 11.1% of the azidomethyl ethylene oxide unit.

EXAMPLE 2

Example 1 was repeated except that five times the amount of epichlorohydrin-ethylene oxide copolymer and dimethylsulfoxide were used but the amount of sodium azide used was 20% of the stoichiometric amount (0.952 part). The product was recovered as in Example 1 except that isopropanol was used as the precipitant in place of methanol. The insoluble polymer, which amounted to a conversion of 79%, had an RSV of 1.9. Analysis showed it to contain 22.8% chlorine and 1.64% nitrogen, showing it contained 3.9% azidomethyl ethylene oxide units.

The ispropanol soluble product was concentrated and the polymer was precipitated with water. The water-insoluble polymer so obtained amounted to a conversion of 15% and nitrogen analysis showed it to contain 3.4% of the azidomethyl ethylene oxide units.

EXAMPLE 3

The procedure of Example 2 was repeated except that the starting polymer was an amorphous poly(epichlorohydrin) containing 0.5% of stabilizer and had a molecular weight of $6 \times 10^6$ and an RSV of 1.8 (measured on a 0.1% solution in α-chloronaphthalene at 100° C.). The amount of sodium azide used was 1.36 parts (20% of the stoichiometric amount). The isopropanol-insoluble product amounted to 8.5 parts and was a rubbery solid having an RSV of 1.5 (measured on a 0.1% solution in tetrachloroethane at 25° C.). Nitrogen analysis showed that the polymer contained 5.8% azidomethyl ethylene oxide units.

EXAMPLE 4

Example 2 was repeated except that the starting polymer was an ethylene oxide-epichlorohydrin copolymer (80–20 by weight, respectively) containing 0.5% stabilizer and had an RSV of 3.5 (measured on a 0.1% solution in α-chloronaphthalene at 100° C.). Instead of sodium azide there was used 0.54 part of lithium azide (40% of the stoichiometric amount). The reaction mixture was tumbled for 8 hours at 65° C. The isopropanol-insoluble polymer was a tough, somewhat rubbery solid in which 3% of the chlorine was replaced by azide groups (0.64% azidomethyl ethylene oxide units). It had an RSV of 1.6.

EXAMPLE 5

Example 1 was repeated using a 70–30 weight percent propylene oxide-epichlorohydrin copolymer containing 0.5% stabilizer and having an RSV of 7.0 as measured on a 0.1% solutuion in α-chloronaphthalene at 100° C. Instead of dimethylsulfoxide, there was used a 50—50 mixture of dimethylsulfoxide and N-methyl pyrrolidone as the solvent diluent. The product was recovered by adding 2 volumes of water, dialyzing against water to remove the dimethylsulfoxide, collecting the insoluble and drying it to constant weight at room temperature under vacuum. It amounted to 1.8 parts and was a rubbery solid, in which 6.6% of the chlorine was replaced with azide groups (2.1% azidomethyl ethylene oxide units). It had an RSV of 4.5.

The following examples illustrate uses of the azido polyethers of this invention.

EXAMPLE 6

A portion of the methanol-soluble, water-insoluble polymer product of Example 1 containing 11.1% of the azidomethyl ethylene oxide units was cross-linked by heating in a pressure tube under a nitrogen atmosphere for 22.5 hours at 160° C. The product so obtained was highly cross-linked as shown by its insolubility in acetone and toluene.

EXAMPLE 7

Two (2) parts of the isopropanol-insoluble polymer of Example 2 containing 3.9% of the azidomethyl ethylene oxide units was dissolved in 12 parts of acetone. To the solution was added 0.0438 part of p-diethynylbenzene (one ethynyl group per azide group). The solvent was removed under vacuum at room temperature and the mixture was then heated in a closed vessel with a nitrogen atmosphere for 26 hours at 65° C. and then at 95° C. for 24 hours. The polymer so produced was slightly swollen but insoluble in benzene and acetone. A gel-swell procedure was used to determine the extent of cross-linking. In this procedure a weighed amount of polymer is heated in excess toluene at 80° C. for 4 hours; the blot-dried pellet is weighed and then dried under vacuum (0.4 mm. Hg) at 80° C. for 16 hours. The percent gel for the polymer product by this test was 75.5 and the percent swell was 386.

In a control run, the azidomethyl polyether (no diethynylbenzene) was heated at 95° C. for 24 hours under nitrogen in a closed vessel had a 60.4% gel and 634% swell.

What I claim and desire to protect by Letters Patent is:

1. An essentially linear polyether wherein from 0 to 99.8% of the repeating units are epihalohydrin monomer units, from 0 to 99.5% of the repeating units are monomer units of at least one other cyclic oxide selected from the group consisting of mono-oxiranes, mono-oxetanes and compounds having one tetrahydrofuran ring and from 0.2 to 100% of the repeating units have the formula

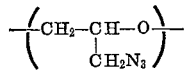

said polyether having a molecular weight of at least about 25,000.

2. The polyether of claim 1 wherein the cyclic oxide is selected from the group consisting of oxiranes, oxetanes and tetrahydrofurans.

3. The polyether of claim 2 wherein the epihalohydrin is epichlorohydrin.

4. The polyether of claim 3 wherein the cyclic oxide is an alklene oxide.

5. The polyether of claim 4 wherein the alkylene oxide is ethylene oxide.

6. The polyether of claim 4 wherein the alkylene oxide is propylene oxide.

7. The polyether of claim 1 wherein 0 to 99.8% of the repeating units are epichlorohydrin units and 0.2 to 100% of the repeating units have the formula

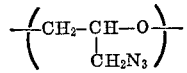

8. The polyether of claim 1 wherein 0 to 99.8% of the repeating units are epichlorohydrin units, from 0 to 99.5% of the repeating units are ethylene oxide units, and from 0.2 to 100% of the repeating units have the formula

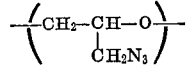

References Cited

UNITED STATES PATENTS

| | | | |
|---|---|---|---|
| 3,284,421 | 11/1966 | Breslow | 260—80.5 |
| 3,316,278 | 4/1967 | Linden et al. | 260—348 |
| 3,410,810 | 11/1968 | Tucker | 260—2 |
| 3,417,036 | 12/1968 | Vandenberg | 260—2 |

WILLIAM H. SHORT, Primary Examiner

E. A. NIELSEN, Assistant Examiner

U.S. Cl. X.R.

117—124, 132, 138.8, 139.5, 155, 161; 161—170, 184, 185, 186; 260—2 D, 2 XA, 88.3 A, 874, 887, 895